US008528419B2

(12) United States Patent
Hussain et al.

(10) Patent No.: US 8,528,419 B2
(45) Date of Patent: Sep. 10, 2013

(54) CORIOLIS MASS FLOWMETER HAVING A REINFORCEMENT ELEMENT FOR SHIFTING IMPLEMENTED EIGENFREQUENCIES OF THE HOUSING AWAY FROM THE OPERATING FREQUENCY

(75) Inventors: Yousif Hussain, Weston Favell (GB); Christopher Rolph, Hartwell (GB); Tao Wang, Canterbury (GB)

(73) Assignee: Krohne AG, Basel (CH)

( * ) Notice: Subject to any disclaimer, the term of this patent is extended or adjusted under 35 U.S.C. 154(b) by 418 days.

(21) Appl. No.: 13/008,544

(22) Filed: Jan. 18, 2011

(65) Prior Publication Data

US 2011/0259124 A1 Oct. 27, 2011

(30) Foreign Application Priority Data

Apr. 23, 2010 (DE) .......................... 10 2010 018 222

(51) Int. Cl.
 *G01F 1/84* (2006.01)
(52) U.S. Cl.
 USPC .................................................... 73/861.355
(58) Field of Classification Search
 None
 See application file for complete search history.

(56) References Cited

U.S. PATENT DOCUMENTS

| 3,583,209 A | 6/1971 | Banks |
| 4,605,838 A | 8/1986 | Daney |
| 4,738,143 A | 4/1988 | Cage et al. |
| 5,291,792 A | 3/1994 | Hussain et al. |
| 7,162,931 B2 | 1/2007 | Moser et al. |
| 7,213,470 B2 | 5/2007 | Gebhardt et al. |
| 7,216,549 B2 | 5/2007 | Rieder et al. |
| 2010/0005906 A1 | 1/2010 | Shimizu et al. |
| 2011/0259121 A1* | 10/2011 | Kolahi et al. ............ 73/861.355 |

FOREIGN PATENT DOCUMENTS

| DE | 38 24 351 A1 | 1/1990 |
| DE | 297 09 692 U1 | 7/1997 |
| DE | 10 2008 007 742 A1 | 11/2008 |
| WO | 03/021203 A1 | 3/2003 |
| WO | 2009/078880 A1 | 6/2009 |

* cited by examiner

*Primary Examiner* — Harshad R Patel
(74) *Attorney, Agent, or Firm* — Roberts Mlotkowski Safran & Cole, P.C.; David S. Safran

(57) ABSTRACT

A Coriolis mass flowmeter (1) with at least one sensor arrangement (2) and at least one housing (3), in which the sensor arrangement (2) includes at least one measuring tube (4), at least one oscillation generator (5) and at least one oscillation sensor (6), and the measuring tube (4) being excited by the oscillation generator (5) in at least one operating frequency. To optimize production costs and weight relative to the size of the measuring device is implemented by at least one reinforcement element (10) being arranged in and joined to the housing (3) in such a manner that the implemented eigenfrequencies of the housing (3) are shifted away from the operating frequency of the measuring tube (4).

11 Claims, 8 Drawing Sheets

CORIOLIS MASS FLOWMETER HAVING A REINFORCEMENT ELEMENT FOR SHIFTING IMPLEMENTED EIGENFREQUENCIES OF THE HOUSING AWAY FROM THE OPERATING FREQUENCY

BACKGROUND OF THE INVENTION

1. Field of the Invention

The invention relates to a Coriolis mass flowmeter with at least one sensor arrangement and at least one housing, wherein the sensor arrangement includes at least one measuring tube, at least one oscillation generator and at least one oscillation sensor, and wherein the measuring tube can be excited by the oscillation generator in at least one operating frequency.

2. Description of Related Art

Coriolis mass flowmeters of the above-mentioned type are known, for example, from German Patent Application DE 10 2008 007 742 A1. In Coriolis mass flowmeters in general, the measuring tube that can have flow from a medium is excited to oscillation by an oscillation generator, preferably in a certain eigenform in resonance frequency—operating frequency, wherein the operating frequency is adapted to the measuring tube together with the medium flowing through the measuring tube. On the input and output sides, inertial forces act differently on the flowing medium in the measuring tube excited to oscillation, and thus, on the measuring tube, so that the deflection of the measuring tube is influenced differently on the input and output sides, and in this manner, the oscillation of the measuring tube detected on the input and output sides with oscillation sensors has a phase shift, which is a direct variable for the mass flow of interest. The derived variable to be detected—the mass flow—is determined using the phase shift by the evaluation electronics.

Depending on the mass flow to be detected, Coriolis mass flowmeters are available with different cross-sections, wherein the size of the measuring device increases overall with an increasing tube cross-section. In order to guarantee sufficient stability of the housing, in particular large housings, so that possible oscillations of the housing during operation do not have negative effects on the quality of the measurement, housings of such Coriolis mass flowmeters are designed with appropriately thick walls. This thick-walled construction is particularly positive in terms of stability, but, as noted by the present inventors, causes the measuring device to become unexpectedly heavier and more expensive to produce that necessary.

SUMMARY OF THE INVENTION

Thus, a primary object of the present invention is, namely, to provide a Coriolis mass flowmeter of the type described above, which is easy to produce and whose weight is optimized in respect to the size of the measuring device.

The above-mentioned object is surprisingly met with a Coriolis mass flowmeter according to said type in that, additionally, at least one reinforcement element is arranged in the housing and the reinforcement element is joined to the housing in such a manner that the implemented eigenfrequencies of the housing are shifted away from the operating frequency of the measuring tube. The reinforcement element is arranged with the measuring tube within the housing of the Coriolis mass flowmeter, and preferably, is linked to the housing at a plurality of contact areas or contact points. Preferably, opposing walls of the housing are interlinked with the reinforcement element, so that the walls are stabilized overall due to the inner mechanical coupling using the reinforcement element and the housing is reinforced collectively. Due to the housing being interlinked with the reinforcement element, the freely-swinging sections of the housing are shortened, through which the implemented eigenfrequencies of the housing are surprisingly increased, in particular in such a manner that the eigenfrequencies of the housing are shifted away from the operating frequency, i.e., away from the operating frequency area of the measuring tube.

That the reinforcement element is linked to the housing does not have to mean that, in fact, a mechanical connection is produced between the reinforcement element and the housing, but can also mean that the reinforcement element is linked by contact, for example via a contact force, and the reinforcement element interacts with the housing in such a manner that the effect according to the invention, namely, the shift of the implemented eigenfrequencies of the housing away from the operating frequency of the measuring tube, is achieved. By the excitation frequency is meant the operating frequency of the measuring tube, which is used for oscillation excitation of the measuring tube by the oscillation generator, wherein this excitation frequency is preferably adjusted to the measuring tube with the medium.

A Coriolis mass flowmeter designed according to the invention can be implemented regardless of the number of measuring tubes actually present in the Coriolis mass flowmeter, so that the following designs having a particular number of measuring tubes is always only to be understood in the manner of an example and a measuring device according to the invention or a measuring device according to the following descriptive designs can always be implemented with a single measuring tube, or also two, three, four or more measuring tubes.

The interaction between the reinforcement element and the housing leads to the oscillation of the housing occurring during operation of the Coriolis mass flowmeter being minimized by the reinforcement element, since the eigenfrequency of the housing is sufficiently far from the operating frequency of the measuring tube—with the measuring medium included therein. The "eigenfrequencies of the housing" describe, here, the eigenfrequencies of all components that are joined with each other and can be attributed to the housing. Depending on the design of the Coriolis mass flowmeter, "housing" can simply mean the actual protective cover or also, for example, the protective cover with attached components that correspondingly "oscillate with" an—undesired—oscillation excitation of the housing.

Due to the additional reinforcement element, the housing is stabilized in such a manner that the wall thickness of the housing can be reduced overall, which leads to a substantial reduction of the weight of the Coriolis mass flowmeter, in particular, in large Coriolis mass flowmeters having large measuring tube cross sections. The reinforcement element can, for example, be designed as an interconnected structure or, alternatively, can be formed of a plurality of individual reinforcement elements, which are arranged rectified in respect to their ability to stabilize within the housing of the Coriolis mass flowmeter and which interact. The reinforcement element, here, does not have direct contact with the measuring tube.

According to a first advantageous design of a Coriolis mass flowmeter according to the invention, it is provided that the measuring tube is bent, in particular, is essentially bent into a U- or V-shape. Preferably, in Coriolis mass flowmeters of this type, two—running parallel—bent measuring tubes are provided that oscillate opposed to each other during operating, so that at least one oscillation can be tapped between the measuring tubes with the oscillation sensor. Due to the bent shape of the measuring tube, the housing of the Coriolis mass flowmeter has to necessarily be larger, so that the reinforcement element has a particularly advantageous effect in such a design, namely leads to a considerable stabilization of the large-volume housing of the Coriolis mass flowmeter, in that the eigenfrequency of the housing is shifted away from the operating frequency of the measuring tube. Due to the large effect on measurement that is achieved with bent measuring tubes as opposed to straight measuring tubes, a simultaneous, increased stability of the housing having eigenfrequencies shifted away from the operating frequency due to the reinforcement element becomes advantageous in that an otherwise present oscillation of the housing does not negatively effect the results of the mass flow measurement or interfere in any other manner.

In order to implement a particularly preferred shift of the implemented eigenfrequencies of the housing away from the operating frequency of the measuring tube, it is provided that the reinforcement element has a basic shape that is arched, wherein the reinforcement element is arranged, in particular, in such a manner in the housing that the curvature of the measuring tube is opposite the curvature of the reinforcement element. The measuring tube has an essentially U- or V-shaped bent course between measuring tube input and measuring tube output. The reinforcement element also has an essentially arched basic shape, wherein "arched basic shape" does not only mean that the reinforcement element follows a constant arc, but can also mean that the reinforcement element, for example, is comprised of a plurality of straight individual parts so that a constant arc-shape is only approximately implemented. In the mounted state, the reinforcement element is, thus, preferably arranged in the housing in such a manner that the curvature of the measuring tube extends opposite to the curvature of the reinforcement element, consequently, the curvatures are arranged opposed to one another in the housing, from which a higher-than-average increase of the stability of the housing is achieved.

The reinforcement element is preferably designed in such a manner that it extends along the measuring tube on at least two longitudinal sides of the housing. Most preferably, the reinforcement element forms a closed outline in a plane, through which the measuring tube passes so that, in the mounted state, the reinforcement element completely surrounds the curvature of the measuring tube and is linked all around on all four sides—longitudinal and narrow sides—to the housing of the Coriolis mass flowmeter, wherein, due to the reinforcement element, not only are the opposing walls of the housing interlinked, but all walls are linked to one another via the reinforcement element. The arc shape of the reinforcement element is optimized using mathematical calculations and formed in such a manner that the eigenfrequencies of the housing are shifted away from the operating frequency of the measuring tube in an advantageous manner.

A connection between the reinforcement element and the housing, which allows for a mechanical interaction between the housing and the reinforcement element, is advantageously implemented in that the reinforcement element is affixed to at least one wall of the housing, in particular is affixed with surface contact, preferably, is adhesively joined to the wall. Due to the attachment of the reinforcement element on at least one wall of the housing, the freely-swinging sections within the housing are shortened. Preferably, however, the reinforcement element is linked with all of the walls of the housing surrounding the reinforcement element, so that a consistent mechanical interaction is implemented between the housing and the reinforcement element. An advantageous attachment of the reinforcement element on the housing can occur advantageously independent of the type of attachment—friction-locked, form-locked or adhesively joined. Screwing, welding and soldering have been shown to be of particular advantage, here.

An adhesively joined attachment between the housing and the reinforcement element can be implemented here, advantageously, in the housing having openings—holes or slits—at the chosen attachment points, so that the walls of the housing can be welded from the outside through the openings to the reinforcement element positioned on the inside, wherein the openings in the housing are closed with welding material during the welding process.

According to a particularly preferred design of the Coriolis mass flowmeter, it is provided that the reinforcement element is formed of at least one hollow body, so that a closed volume is defined within the reinforcement element and a medium can be conveyed within the reinforcement element. The reinforcement element consequently forms an inner volume within the housing separate from the volume of the housing, so that a medium can be conveyed within the reinforcement element and the medium cannot unintentionally come out of the reinforcement element—into the housing.

This design is particularly suitable for applications in which, for example, the measuring tube or the housing has to be brought to a temperature, i.e., either the housing itself or the measuring medium within the measuring tube has to be adjusted to or kept at a certain temperature. Here, such applications are conceivable in which heating is necessary, as well as cryogenic applications where cooling is necessary. A heating medium, e.g., hot water or steam, can then be conveyed through the reinforcement element, so that the thermal energy from the heating medium is transferred to the Coriolis mass flowmeter—to the housing and/or the measuring tube. Heating the Coriolis mass flowmeter is necessary, in particular, when a hot medium is conveyed within the measuring tube, which has to be kept at a certain temperature, so that it does not become solid—tar, wax, etc.—and/or temperature-induced friction has to be avoided in the Coriolis mass flowmeter.

Consequently, this design has the advantage that it combines a heating unit for the Coriolis mass flowmeter with a reinforcement element for the housing, through which additional weight and space are saved. It is no longer necessary to have space outside the measuring device for a heating unit, since the heating unit is advantageously integrated on the inside of the housing.

In order to guarantee accessibility of the volume of the reinforcement element, it is provided according to a further development that the volume of the reinforcement element has at least one input opening and at least one output opening, so that a medium can be conveyed into the volume or can be conveyed out of the volume. The input opening and the output opening of the volume of the reinforcement element are preferably accessible from outside of the housing of the Coriolis mass flowmeter, in that the input opening and the output opening extend through the housing of the mass flowmeter as connecting pieces and are positioned at accessible points.

A medium, e.g., a heating or cooling medium is introduced into the volume of the reinforcement element through the input opening, wherein the medium releases, for example, thermal energy to the housing or to the measuring tube on its path through the volume of the reinforcement element within the housing and then exits again out of the volume through the output opening in a cooled state. Thus, it is advantageous for an optimal thermal transfer between the housing and the reinforcement element when the reinforcement element lies against the walls of the housing with as much surface as possible, so that an optimal thermal transfer between the reinforcement element and the housing of the Coriolis mass flowmeter can occur. An adhesively joined attachment between the housing and the reinforcement element also positively effects the thermal transfer. It should, thus, be taken into consideration when choosing a form of attachment that the type of attachment between the housing and the reinforcement element positively effects the thermal transfer as well as the mechanical interaction between reinforcement element and housing.

A particularly stable reinforcement element exists when the reinforcement element is designed as a welded hollow frame structure, preferably is welded together of essentially straight single parts and has, in particular, vertical and/or horizontal cross beams. The design of the reinforcement element becomes very flexible due to this type of construction, since the reinforcement element can be adapted to the individual conditions of the corresponding measuring device and a mathematically optimized form during its production. The volume is designed as a canal system due to the hollow frame structure within the reinforcement element, through which a medium can be conveyed. Preferably, all individual parts are linked to one another within the welded hollow structure via a common volume. The reinforcement element can have additional vertical and/or horizontal cross beams through the design as welded structure, which additionally support or stabilize the housing.

Alternatively, a design of the reinforcement element is also provided in which, for example, two independent hollow frame structures are provided above one another or next to one another within the housing for reinforcing the housing, wherein, for example, a medium can be conveyed through only one or also through both reinforcement elements.

As a further alternative to the design of the reinforcement element, it is also provided that the reinforcement element is formed from a plurality of interlinked canals, which—each on their own—are welded to the walls of the housing and for a common volume, so that the walls are stabilized and an advantageous thermal transfer is possible.

Within the cage-like construction of the reinforcement element from the welded hollow frame structure, it is also necessary that the individual elements of the reinforcement element are additionally stabilized among themselves, so that it is provided by a further design of the invention that the reinforcement element has flat reinforcement means reinforcing the reinforcement element in at least one corner region. These reinforcement means are, for example, provided on a joint of two individual parts of the welded hollow frame structure and stabilize the angle between the two elements, in that a plate-shaped reinforcement plate is welded into the angle as a reinforcement means.

In particular, in a Coriolis mass flowmeter with arcuate measuring tubes, it has been shown to be advantageous when the reinforcement element and the measuring tube cross each other essentially orthogonally at least one point in the housing. The design has the advantage that a thermal transfer can occur from the reinforcement element to the measuring tube—using convection and radiation—wherein, at the same time, an advantageous stabilization of the housing occurs. The cross-beams of the reinforcement element are provided so that they are both vertical and parallel within the oscillations plane of the measuring tube.

In order to optimize the thermal transfer between the reinforcement element and the measuring tube, for example, for applications in which the medium conveyed in the measuring tube has to be heated so that it does not become solid, it is provided that at least one section of the reinforcement element extends essentially parallel to the measuring tube, so that an intensive thermal transfer between the reinforcement element and the measuring tube occurs. Preferably, for example, the reinforcement element is lead parallel to the measuring tube in a very large section, so that a thermal transfer can occur between the reinforcement element and the measuring tube by convection and radiation in a large area. Here, the reinforcement element is designed, for example, so that individual elements of the reinforcement element are provided solely for mechanically stiffening the housing and other elements of the reinforcement element are solely for the purpose of optimizing the thermal transfer between the reinforcement element and the measuring tube or the housing, i.e. convey a medium.

The thermal transfer between the reinforcement element and the housing or the measuring tube is optimized in that the reinforcement element is made of a material with a high thermal conductivity, so that the thermal path through the reinforcement element occurs with as little loss as possible. The reinforcement element is made, for example, of stainless steel, titanium or tantalum, wherein copper or aluminum may also be used.

For the operation of the above-described Coriolis mass flowmeters, a method is particularly suitable in which a medium brought to a pre-determined temperature is conveyed within the volume of the reinforcement element. In particular, for applications in which the medium within the measuring tube has a defined temperature, this method is suitable either for keeping the medium at this temperature or for heating or cooling it. For this purpose, the temperature of the medium being introduced into the volume of the reinforcement element is given in a corresponding setting with the specifications for the temperature of the measuring medium. In particular, for example, applications with a heating medium are possible in which the medium conveyed in the measuring tube cannot be allowed to cool down, since it would then become solid. Alternatively, cryogenic applications are possible, in particular in the food industry, in which the medium to be measured has to be kept at a very low temperature or has to be cooled down to a very cool temperature.

In detail, there are multiple possibilities for designing and further developing the Coriolis mass flowmeter according to the invention. Here, reference is made to following detailed description of embodiments in connection with the accompanying drawings.

DETAILED DESCRIPTION OF THE INVENTION

Figure 1:
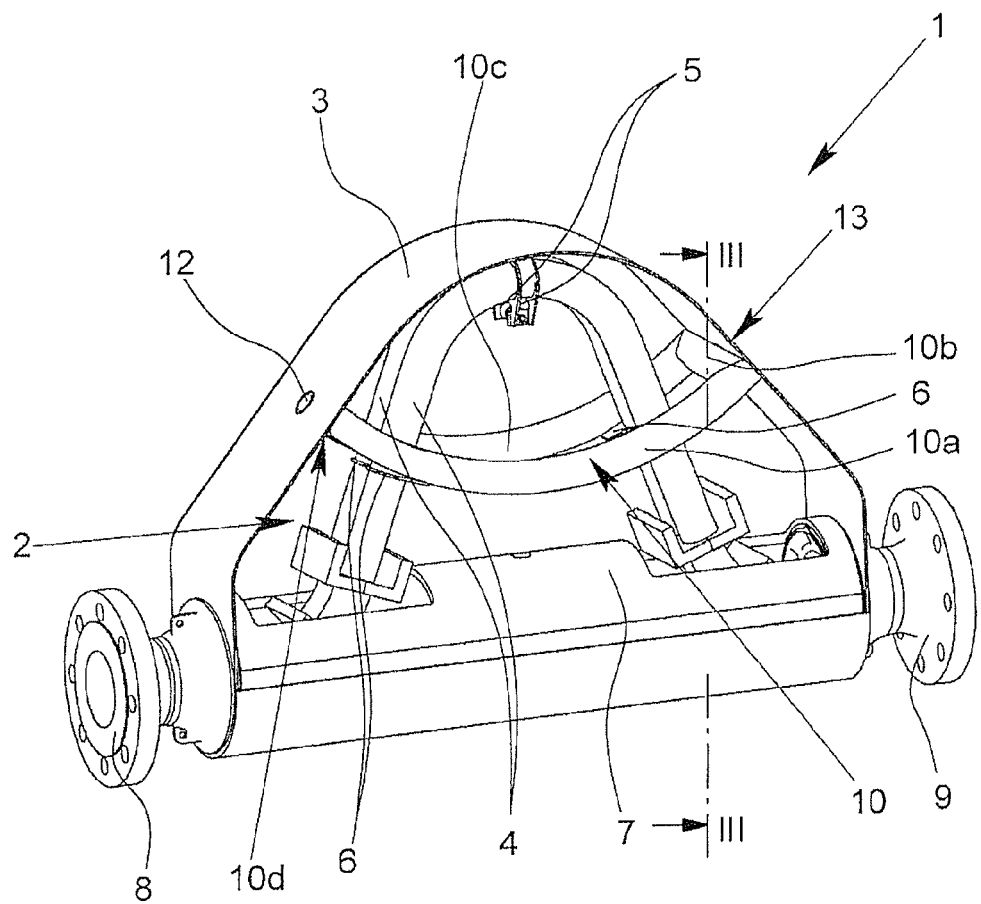
FIG. 1 is a perspective side view of an embodiment of a Coriolis mass flowmeter partially in section.

FIG. 1 shows a Coriolis mass flowmeter 1 having a sensor arrangement 2 and a housing 3, wherein the front-most side wall of the housing 3 is cut away in the representation in FIG. 1. The sensor arrangement 2 includes two measuring tubes 4, an oscillation generator 5 and two oscillation sensors 6, wherein the oscillation generator 5 and the oscillation sensor 6 each are comprised of two interacting elements, and respectively, one element of the oscillation sensor 6 or the oscillation generator 5 is attached to one of the measuring tubes 4. The housing 3 is attached to a support bridge 7, wherein the support bridge 7 extends between the input flange 8 and the output flange 9 of the Coriolis mass flowmeter. The input flange 8 and the output flange 9 are also attached to the support bridge 7. The transfer between input flange 8 and the measuring tubes 4 occurs on—shown on the left in FIG. 1—the end of the support bridge 7, wherein the measuring tubes 4 are designed as bent measuring tubes in this embodiment and extend upward out of the support bridge 7, execute the essentially U- or V-shaped course and—shown on the right in FIG. 1—finally extend back into the support bridge 7, where the measuring tubes 4 are linked to the output flange 9 of the Coriolis mass flowmeter.

Within the housing 3—surrounding the measuring tubes—a reinforcement element 10 is provided in the housing 3, which has surface contact with all walls of the housing 3 and is welded to the walls of the housing 3. The reinforcement element 10 that is formed of a welded hollow frame structure having a rectangular cross-section, in profile, so that the reinforcement element 10 makes surface contact with the walls of the housing 3. The reinforcement element 10 has an essentially arcuate basic form in a longitudinal direction, and wherein the reinforcement element 10 is attached in the housing 3 of the Coriolis mass flowmeter 1 in such a manner that the curvature of the measuring tube 4 is opposite the curvature of the reinforcement element 10. Due to this positioning of the reinforcement element 10 in the housing 3, an advantageous shift of the eigenfrequency of the housing away from the operating frequency of the measuring tubes 4 is achieved.

The reinforcement element 10 is produced of hollow individual parts 10a, 10b, 10c and 10d, so that a closed volume 11 is formed within the hollow reinforcement element 10, in which a medium can be conveyed. The volume 11 is accessible from outside of the housing 3 in the assembled state through an input opening 12 or through an output opening 13. The output opening 13 or the input opening 12 extend through the wall of the housing, so that a medium can be conveyed in or conveyed out for heating or cooling.

Figure 2:
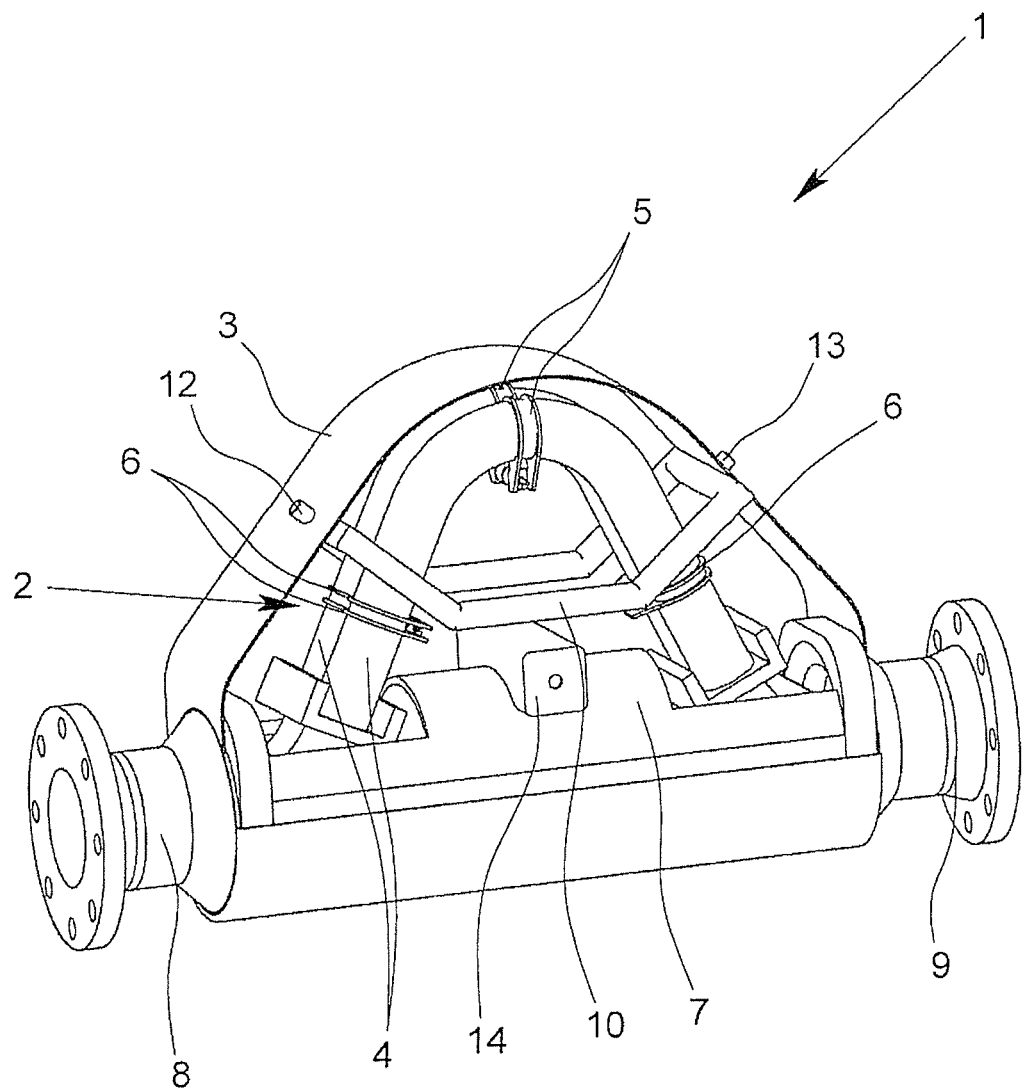
FIG. 2 is a perspective side view of a further embodiment of a Coriolis mass flowmeter in a partial section.

FIG. 2 shows a further embodiment of a Coriolis mass flowmeter 1, wherein the embodiment according to FIG. 2 differs from the embodiment in FIG. 1 essentially in that it has a first reinforcement element 10 which an essentially arcuate basic form that is produced as a welded hollow frame structure from a plurality of straight individual parts, and in addition, has a second reinforcement element 14 that is attached to the support bridge 7 and extends between the two flat side walls of the housing 3 essentially orthogonal to the support bridge 7. The second reinforcement element 14 links the opposing side walls to one another, stabilizes the housing and changes the eigenfrequencies of the housing through this internal mechanical coupling.

The reinforcement elements 10, 14 are positioned independent of each other, adjacent to one another in the housing 3; however, both reinforcement elements 10, 14 aid in the reinforcement of the housing 3 and the shift of the eigenfrequency of the housing away from the operating frequency of the measuring tubes 4. In this embodiment, only a medium can be conveyed in the first reinforcement element 10 being introduced at the input opening 12 in the first reinforcement element 10 and can be expelled at the output opening 13 in the first reinforcement element 10. While the first reinforcement element 10 is completely welded with the walls of the housing 3—also with the front-most wall that is not shown—the second reinforcement element 14 is only screwed together with the side walls of the housing 3.

Figure 3:
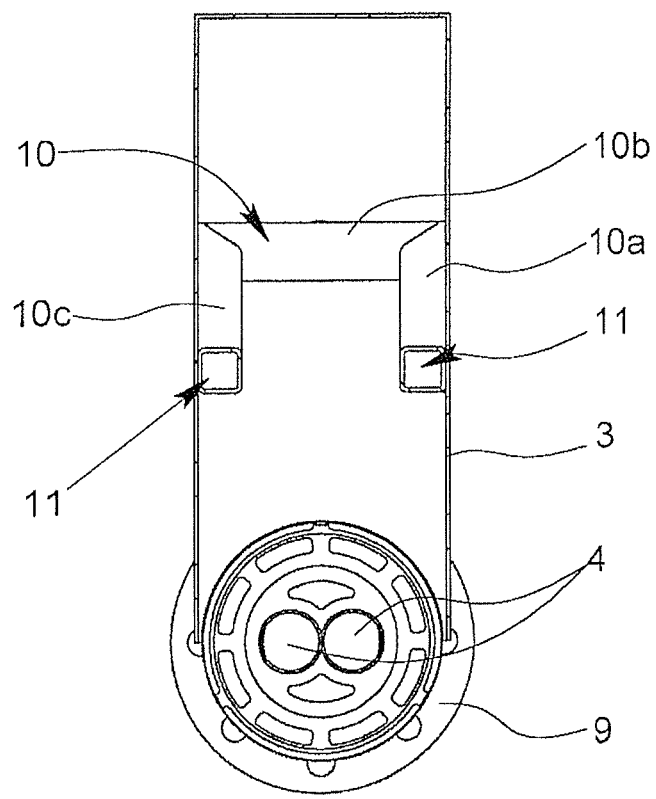
FIG. 3 is transverse sectional view of the embodiment of a Coriolis mass flowmeter taken along line in FIG. 1 and FIGS. 4a-4e are perspective side views different alternative designs for the reinforcement elements of a Coriolis mass flowmeter.

FIG. 3 shows the embodiment according to FIG. 1 in a partial section, front view, wherein the measuring tubes 4 are only shown in the area of the support bridge 7. The reinforcement element 10 has surface contact with all walls of the housing 3 with its rectangular cross-section and is welded to the walls of the housing 3, so that an optimal thermal transfer can occur between the medium conveyed in the volume 11 of the reinforcement element 10 and the walls of the housing 3. In the mounted state, the arc-shaped measuring tubes 4 normally run between both individual parts 10c and 10a of the reinforcement element 10 arranged on the sides.

Figure 4A:
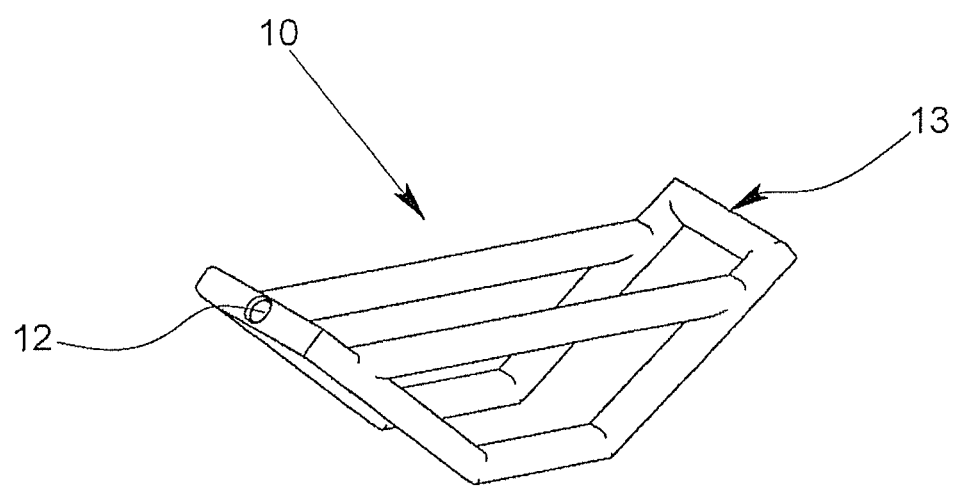
Figure 4B:
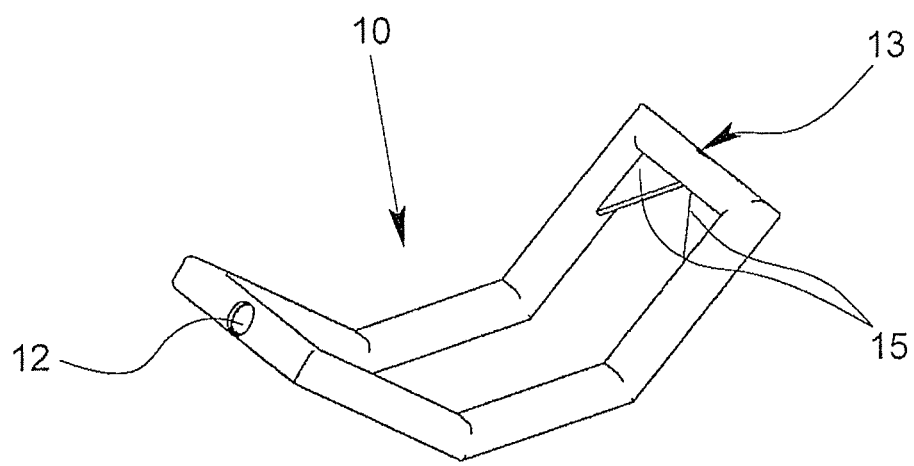
Figure 4C:
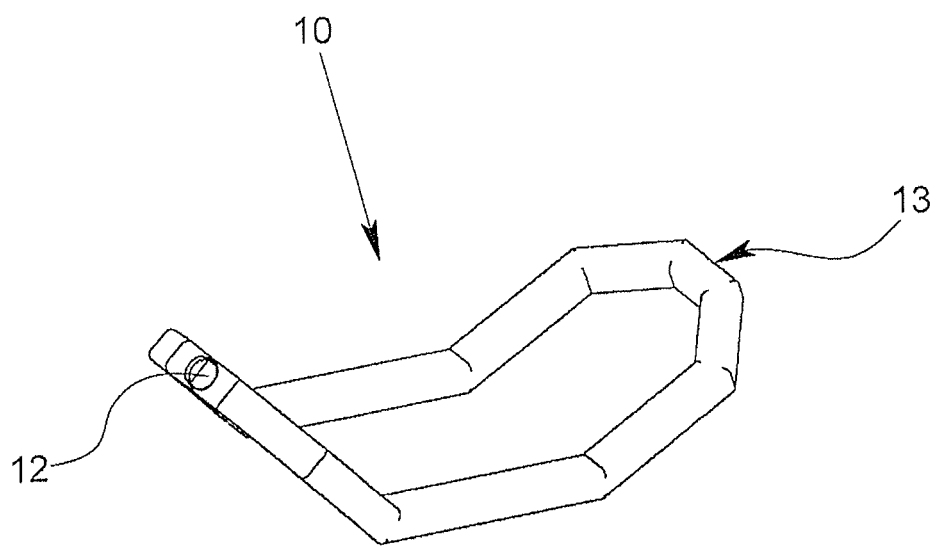
Figure 4D:
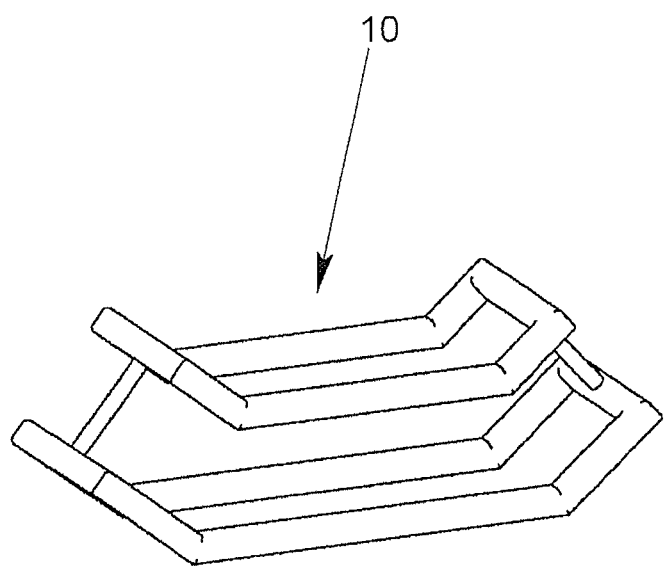
Figure 4E:
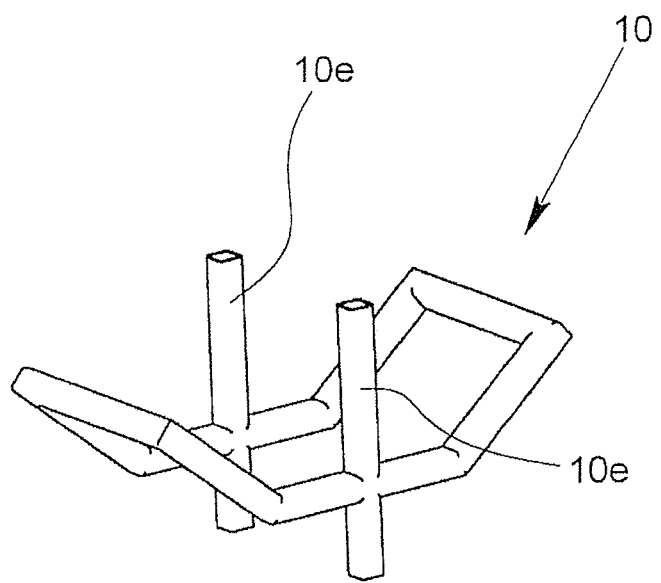

FIGS. 4a to 4e show different embodiments of reinforcement elements 10, wherein a medium can be conveyed only in the embodiments shown in FIGS. 4a to 4c; a medium cannot be conveyed in the embodiments shown in FIGS. 4d and 4e.

The reinforcement element shown in FIGS. 4a to 4e have in common that they all—in respect to their longitudinal sides—have an essentially arcuate basic shape formed of welded hollow frame structures. In FIG. 4a, the reinforcement 10 of FIG. 2 is supplemented by the provision of horizontal cross beams which additionally support or stabilize the housing.

The reinforcement means 15 shown, for example, in FIG. 4b is provided to stabilize the reinforcement means 10, being arranged at the joints of two individual parts of the reinforcement element 10 and welded thereto, so that a supporting effect occurs in the angles via the flat reinforcement means 15 shown here as triangular plates.

FIG. 4d, two hollow frame structures are provided one above the other within the housing for reinforcing the housing. In this case, a medium can be conveyed through only one or also through both reinforcement elements 10. Furthermore, the two hollow frame structures can be connected as shown or can be independent of each other.

In addition to the normally horizontally and diagonally extending individual parts of the reinforcement element 10, the embodiment shown in FIG. 4e additionally has vertical individual parts 10e on each longitudinal side, which aid in the transfer of force in the vertical direction and further stabilization of the reinforcement element 10.

All of the embodiments for reinforcement elements 10 shown in FIGS. 4a to 4e are provided for use in a Coriolis mass flowmeter 1 according to FIGS. 1 and 2.

What is claimed is:

1. Coriolis mass flowmeter, comprising:
   at least one sensor arrangement having at least one measuring tube, at least one oscillation generator and at least one oscillation sensor, the oscillation generator being adapted to excite the measuring tube in at least one operating frequency,
   at least one housing for enclosing the at least one sensor arrangement,
   and at least one reinforcement element arranged in and joined to the housing in such a manner that implemented eigenfrequencies of the housing are shifted away from an operating frequency of the at least one measuring tube
   wherein the at least one reinforcement element comprises at least one hollow body defining a closed volume within the reinforcement element through which a heat transfer medium is conveyable from at least one input opening to at least one output opening.

2. Coriolis mass flowmeter according to claim 1, characterized in that the at least one measuring tube has an arcuate shape.

3. Coriolis mass flowmeter according to claim 2, wherein the at least one measuring tube has an arcuate curvature and wherein the at least one reinforcement element is arranged in the housing in such a manner that it has a curvature that is opposite that of the at least one measuring tube.

4. Coriolis mass flowmeter according to claim 1, wherein the reinforcement element is affixed to at least one wall of the housing.

5. Coriolis mass flowmeter according to claim 4, wherein the affixing of the at least one reinforcement element is by a bonded surface contact.

6. Coriolis mass flowmeter according to claim 1, wherein at least one section of the at least one reinforcement element extends essentially parallel to the at least one measuring tube for enabling an intensive heat transfer between the at least one reinforcement element and at least one the measuring tube.

7. Coriolis mass flowmeter according to claim 1, wherein the at least one reinforcement element is comprised of a hollow frame structure formed of essentially straight parts welded together.

8. Coriolis mass flowmeter according to claim 1, wherein the at least one reinforcement element has flat reinforcement means for reinforcing the reinforcement element in at least one corner region.

9. Coriolis mass flowmeter according to claim 1, the at least one reinforcement element and the at least one measuring tube cross each other essentially orthogonally at least one point in the housing.

10. Coriolis mass flowmeter according to claim 1, wherein the reinforcement element is formed of a material having a high thermal conductivity for enabling thermal energy to be transferred through a wall of the at least one reinforcement element with as little loss as possible.

11. Method for operating a Coriolis mass flowmeter having at least one sensor arrangement having at least one measuring tube, at least one oscillation generator and at least one oscillation sensor, the oscillation generator being adapted to excite the measuring tube in at least one operating frequency, at least one housing for enclosing the at least one sensor arrangement, and at least one reinforcement element arranged in and joined to the housing in such a manner that implemented eigenfrequencies of the housing are shifted away from an operating frequency of the at least one measuring tube, wherein the at least one reinforcement element is formed of at least one hollow body defining a closed volume within the reinforcement element through which a heat transfer medium is conveyable from at least one input opening to at least one output opening, comprising the steps of:

bringing a heat transfer medium to a pre-defined temperature, conveying the heat transfer medium within the volume of the reinforcement element so as to adjust the temperature of at least one of Coriolis mass flowmeter and a measuring medium flowing within the measuring tube.

* * * * *